(12) United States Patent
Wu

(10) Patent No.: US 10,647,518 B2
(45) Date of Patent: May 12, 2020

(54) SPIRAL CONVEYING MESH CHAIN

(71) Applicant: Baodong Wu, Yangzhou (CN)

(72) Inventor: Baodong Wu, Yangzhou (CN)

( * ) Notice: Subject to any disclaimer, the term of this patent is extended or adjusted under 35 U.S.C. 154(b) by 112 days.

(21) Appl. No.: 16/067,597

(22) PCT Filed: Nov. 30, 2017

(86) PCT No.: PCT/CN2017/113708
§ 371 (c)(1),
(2) Date: Jun. 30, 2018

(87) PCT Pub. No.: WO2019/015201
PCT Pub. Date: Jan. 24, 2019

(65) Prior Publication Data
US 2019/0382207 A1   Dec. 19, 2019

(30) Foreign Application Priority Data

Jul. 18, 2017  (CN) .......................... 2017 1 0583835

(51) Int. Cl.
| | | |
|---|---|---|
| *B65G 21/18* | (2006.01) | |
| *B65G 17/38* | (2006.01) | |
| *B65G 35/00* | (2006.01) | |
| *B65G 17/06* | (2006.01) | |
| *B65G 23/14* | (2006.01) | |
| *F16G 13/07* | (2006.01) | |

(52) U.S. Cl.
CPC ........... *B65G 35/00* (2013.01); *B65G 17/068* (2013.01); *B65G 21/18* (2013.01); *B65G 17/38* (2013.01); *B65G 23/14* (2013.01); *B65G 2207/24* (2013.01); *F16G 13/07* (2013.01)

(58) Field of Classification Search
CPC ............................ B65G 21/18; B65G 2207/24
USPC ......................................................... 198/778
See application file for complete search history.

(56) References Cited

U.S. PATENT DOCUMENTS

| 5,137,141 A * | 8/1992 | Irwin ................... B65G 17/086 |
| | | 198/778 |
| 2011/0056806 A1* | 3/2011 | Johnson ................. B65G 21/18 |
| | | 198/778 |

(Continued)

FOREIGN PATENT DOCUMENTS

| CN | 1291580 A | 4/2001 |
| CN | 106829320 A | 6/2017 |
| CN | 107352231 A | 11/2017 |

*Primary Examiner* — James R Bidwell
(74) *Attorney, Agent, or Firm* — Bayramoglu Law Offices LLC

(57) ABSTRACT

A spiral conveying mesh chain which pertains to the field of conveying equipment includes a conveying mesh chain main body. The edge of the inner side of the conveying mesh chain main body is uniformly provided with passive teeth. The passive teeth are used to engage with driving teeth on the outer periphery of a rotating drum for driving the conveying mesh chain main body to rotate. The contact surface of the passive tooth and the driving tooth is one item selected from a group consisting of an inclined surface, an arc-shaped surface, a V-shaped contact surface, and a T-shaped contact surface, so that the force direction between the passive tooth and the driving tooth is inwardly deviated relative to the rotation direction of the conveying mesh chain.

2 Claims, 7 Drawing Sheets

(56) References Cited

U.S. PATENT DOCUMENTS

2015/0047952 A1* 2/2015 Talsma .................. B65G 15/60
198/778
2018/0194565 A1* 7/2018 Elsner .................... B65G 21/18

* cited by examiner

SPIRAL CONVEYING MESH CHAIN

CROSS REFERENCE TO RELATED APPLICATIONS

This application is the national phase entry of International Application No.PCT/CN2017/113708, filed on Nov. 30, 2017, which is based upon and claims priority to Chinese Patent Application No. 201710583835.8, filed on Jul. 18, 2017, the entire contents of which are incorporated herein by reference.

TECHNICAL FIELD

The present invention relates to the field of conveying equipment, particularly to a spiral conveying mesh chain.

BACKGROUND

As shown in FIG. 7, the existing spiral conveying mesh chain is driven by a rotary drum. The rotary drum cooperates with the spiral conveying mesh chain through square passive tooth and driving tooth in transmission manner. When the passive tooth of the spiral conveying chain mesh rotates, the force direction k between the passive tooth and the driving tooth is outwardly deviated relative to the driving direction j of the spiral conveying mesh chain. When the spiral conveying mesh chain has relatively small tightening force on the rotary drum, the passive tooth of the spiral conveying mesh chain tends to separate and detach from the square driving tooth on the rotary drum, as a result, the spiral conveying mesh chain cannot rotate with the rotary drum accordingly.

SUMMARY

The objective of the present invention is to provide a spiral conveying mesh chain which can effectively address the problems mentioned in the background.

The technical solution to achieve the above-mentioned objective is as follows. A spiral conveying mesh chain includes a conveying mesh chain main body. The edge of the inner side of the conveying mesh chain is uniformly provided with passive teeth. The passive teeth are used to engage with the driving teeth on an outer periphery of the rotary drum that drives the conveying mesh chain main body to rotate. The contact surfaces of the passive teeth and the driving teeth is one item selected from inclined surface, arc-shaped surface, V-shaped contact surface, and T-shaped contact surface, so that the force direction between the passive tooth and the driving tooth is inwardly deviated relative to the rotation direction of the conveying mesh chain main body.

The present invention has the following advantages.

In the present invention, the contact surface of the driving tooth on the outer periphery of the rotary drum and the passive tooth of the conveying mesh chain main body is one item selected from inclined surface, arc-shaped surface, V-shaped contact surface, and T-shaped contact surface, so that the force direction between the driving tooth and the passive tooth is inwardly deviated relative to the rotation direction of the conveying mesh chain. When the conveying mesh chain has a relatively small tightening force on the rotary drum, the passive teeth of the conveying mesh chain will not separate and detach from the driving teeth of the rotary drum, so the conveying mesh chain can rotate with the rotary drum, continuously.

DETAILED DESCRIPTION

First Embodiment

Figure 1:
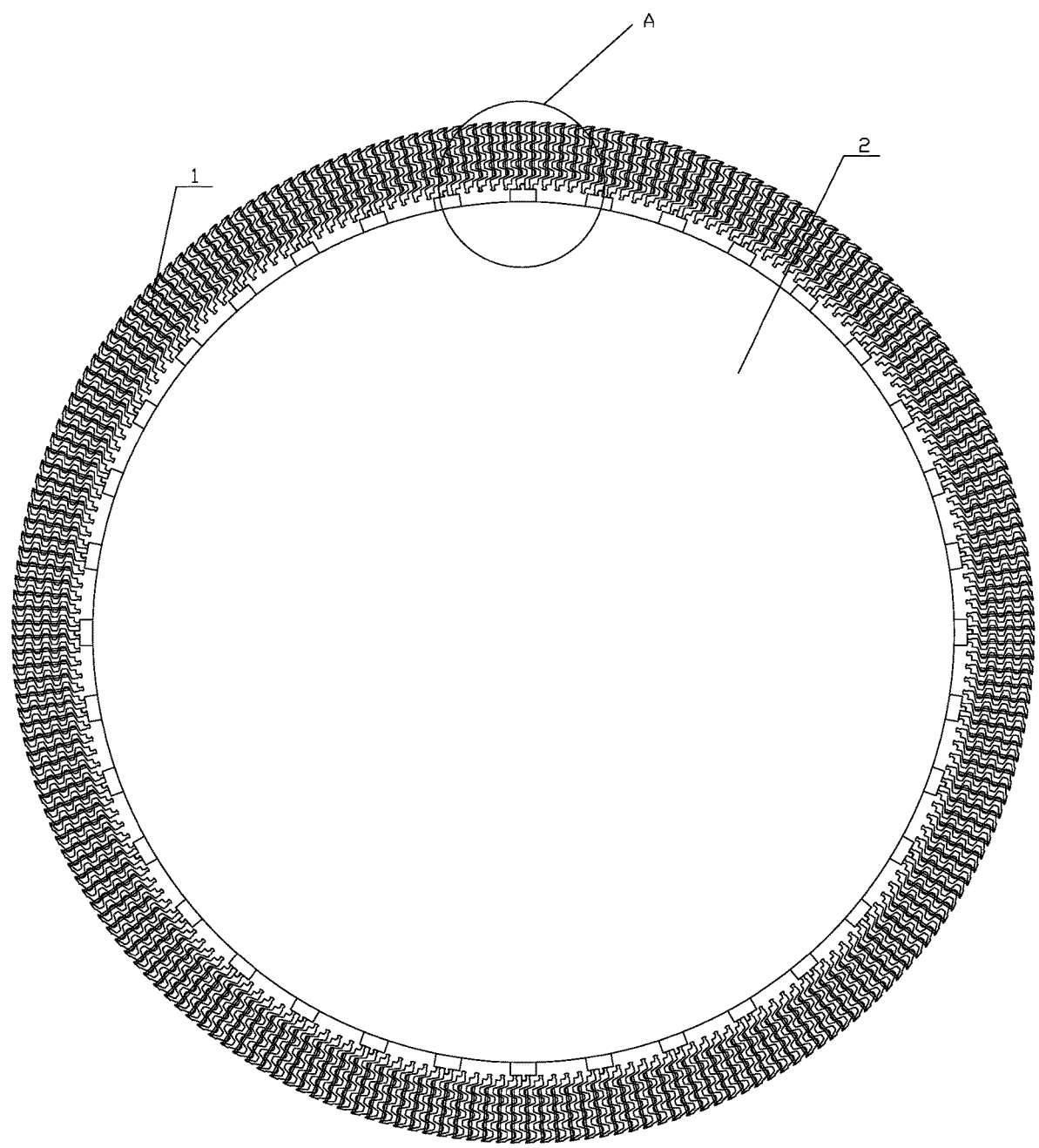
FIG. 1 is a structural schematic view of the first embodiment.
Figure 2:
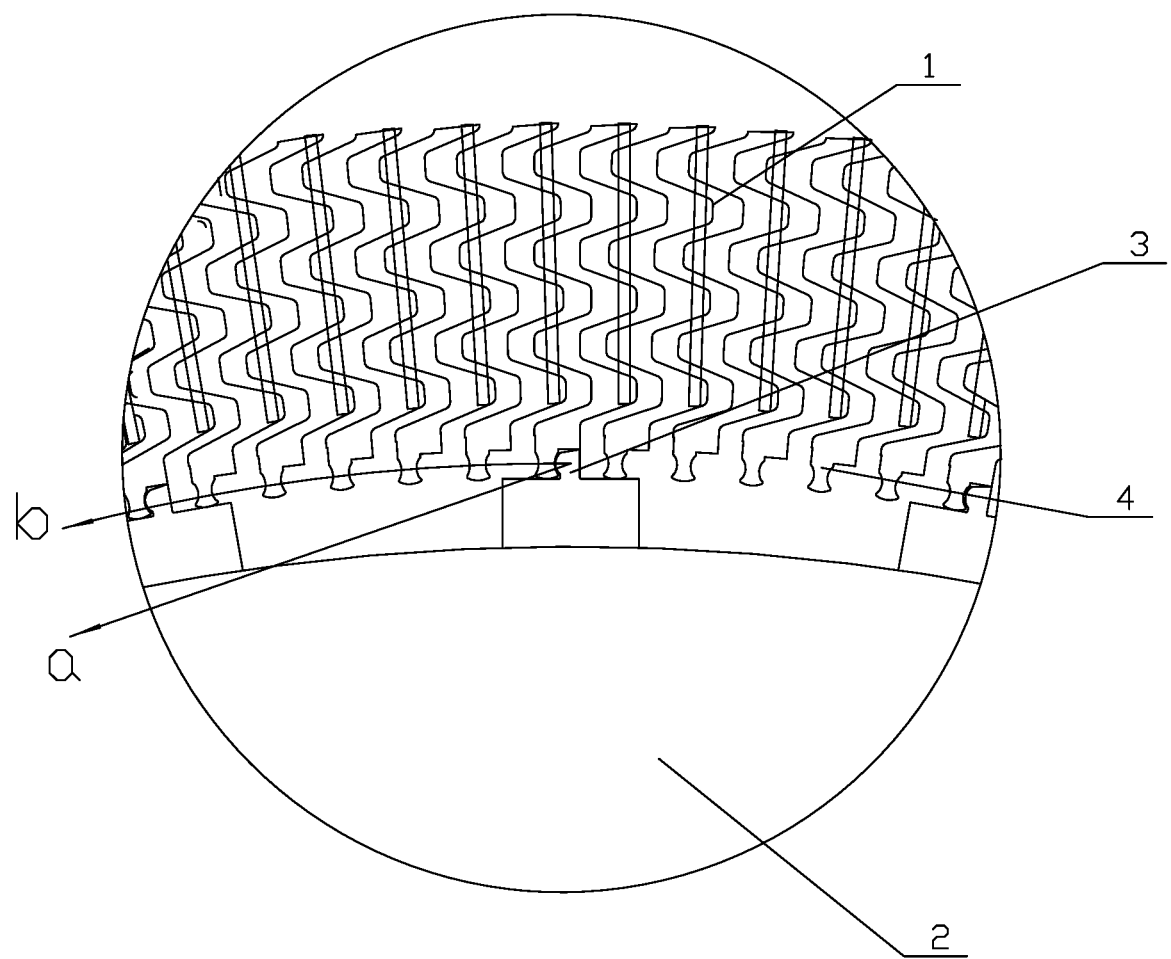
FIG. 2 is an enlarged view of Part A of FIG. 1.

As shown in FIGS. 1 and 2, the present invention includes a conveying mesh chain 1 and a rotary drum 2. The edge of the inner side of the conveying mesh chain 1 is uniformly provided with passive teeth 4. The outer periphery of the rotary drum 2 is provided with driving teeth 3 that are engaged with the passive teeth 4. The contact surface between the driving tooth 3 and passive tooth 4 is an arc-shaped surface, and the concave arc of the arc-shaped surface is arranged on the passive tooth 4.

In this embodiment, the force direction a between driving tooth 3 and passive tooth 4 is inwardly deviated relative to the rotation direction b of conveying mesh chain 1, so that when the tightening force of conveying mesh chain 1 is relatively small, the passive teeth 4 of the conveying mesh chain 1 will not separate and detach from the driving teeth 3 on the rotary drum 2, and the conveying mesh chain 1 can rotate with the rotary drum, accordingly.

Second Embodiment

Figure 3:
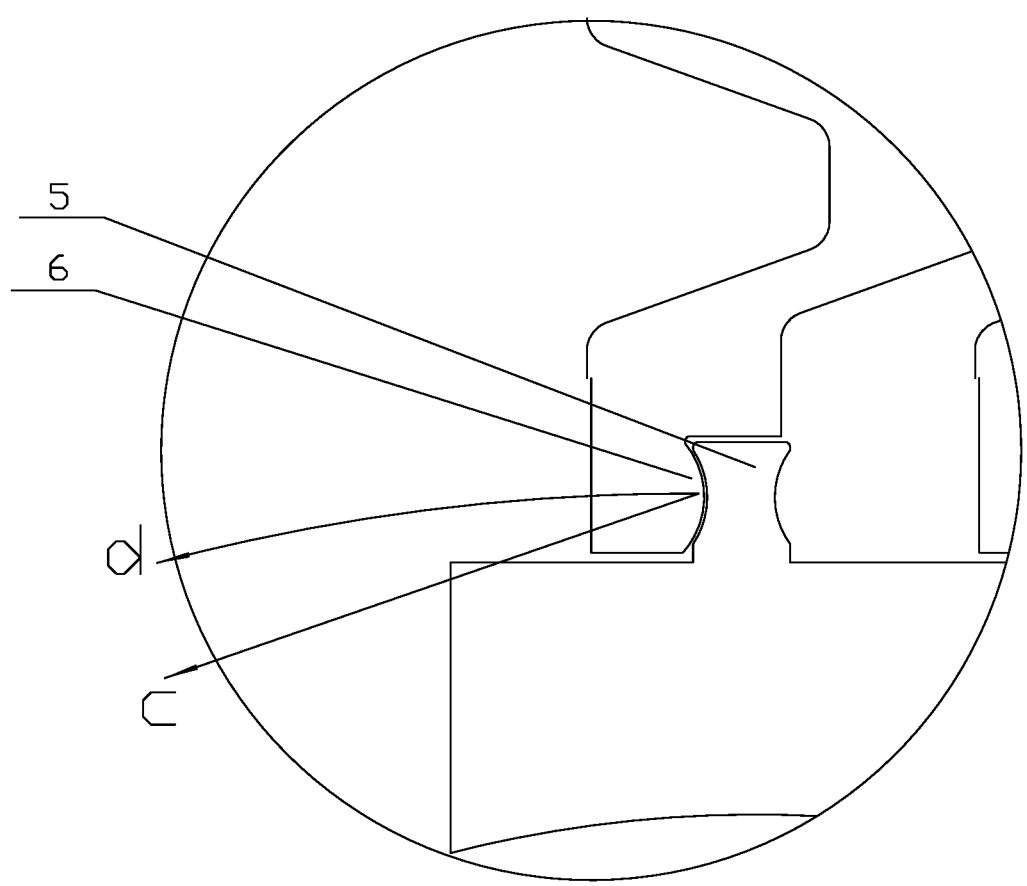
FIG. 3 is a structural schematic view of the second embodiment.

As shown in FIG. 3, the structure of the second embodiment is basically the same as the structure of the first embodiment. The difference is that the contact surface between driving tooth 5 and the passive tooth 6 is an arc-shaped surface, and the concave arc of the arc-shaped surface is provided on the driving teeth 5.

In this embodiment, the force direction c between the driving tooth 5 and passive tooth 6 is inwardly deviated relative to the rotation direction d of the conveying mesh chain 1, so that when the tightening force of the conveying mesh chain is relatively small, passive teeth 6 of the conveying mesh chain will not separate and detach from the driving teeth 5 on the rotary drum, and the conveying mesh chain can rotate with the rotary drum, accordingly.

Third Embodiment

Figure 4:
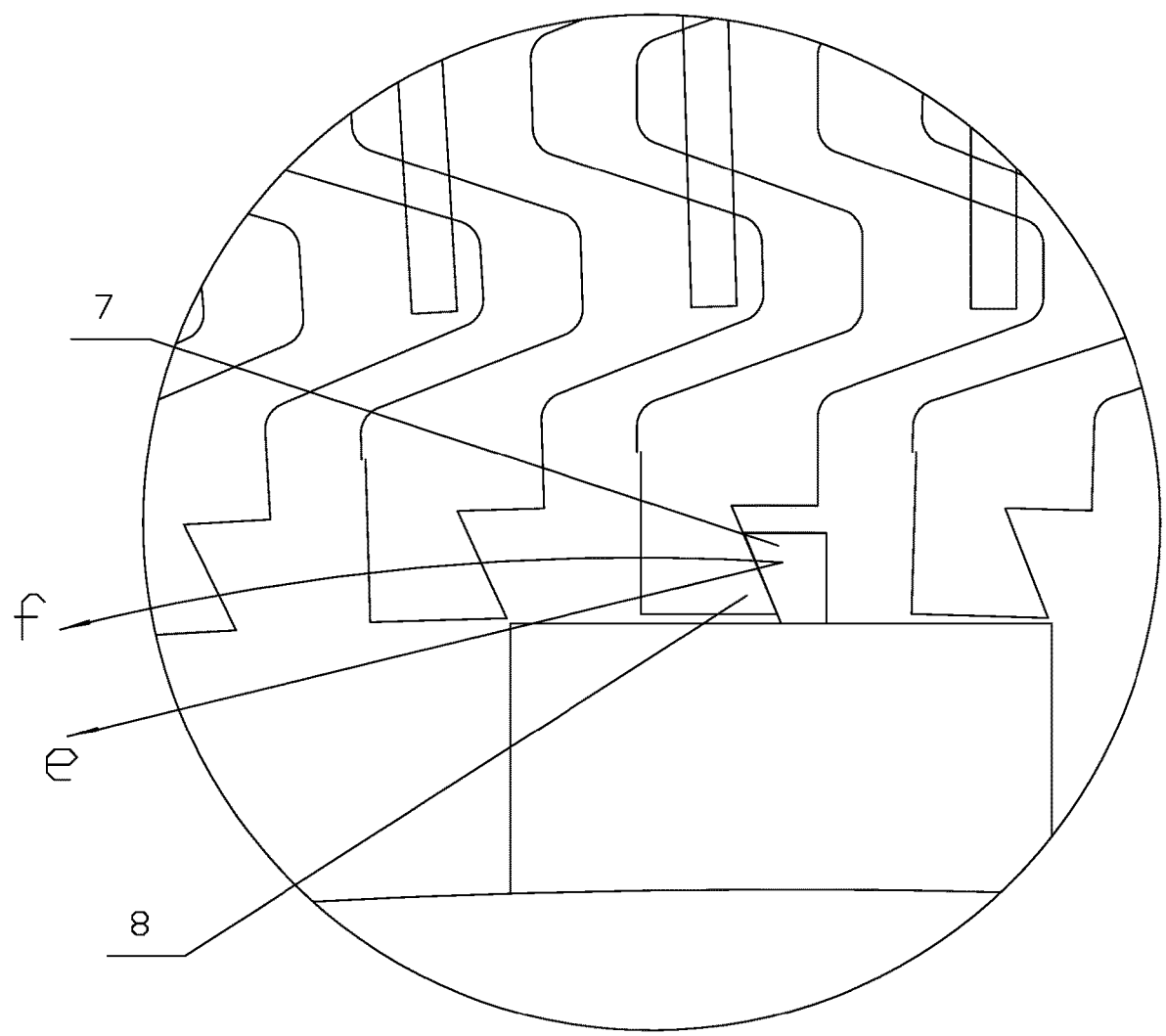
FIG. 4 is a structural schematic view of the third embodiment.

As shown in FIG. 4, the structure of the third embodiment is basically the same as the structure of the first embodiment. The difference is that the contact surface between driving tooth 7 and passive tooth 8 is an inclined surface inclined towards the side along the rotation direction.

In this embodiment, the force direction e between the driving tooth 7 and the passive tooth 8 is inwardly deviated relative to the rotation direction f of the conveying mesh chain 1, so that when the tightening force of the conveying mesh chain is relatively small, the passive tooth 8 of the conveying mesh chain will not separate and detach from the driving tooth 7 of the rotary drum, and the conveying mesh chain can rotate with the rotary drum, accordingly.

Fourth Embodiment

Figure 5:
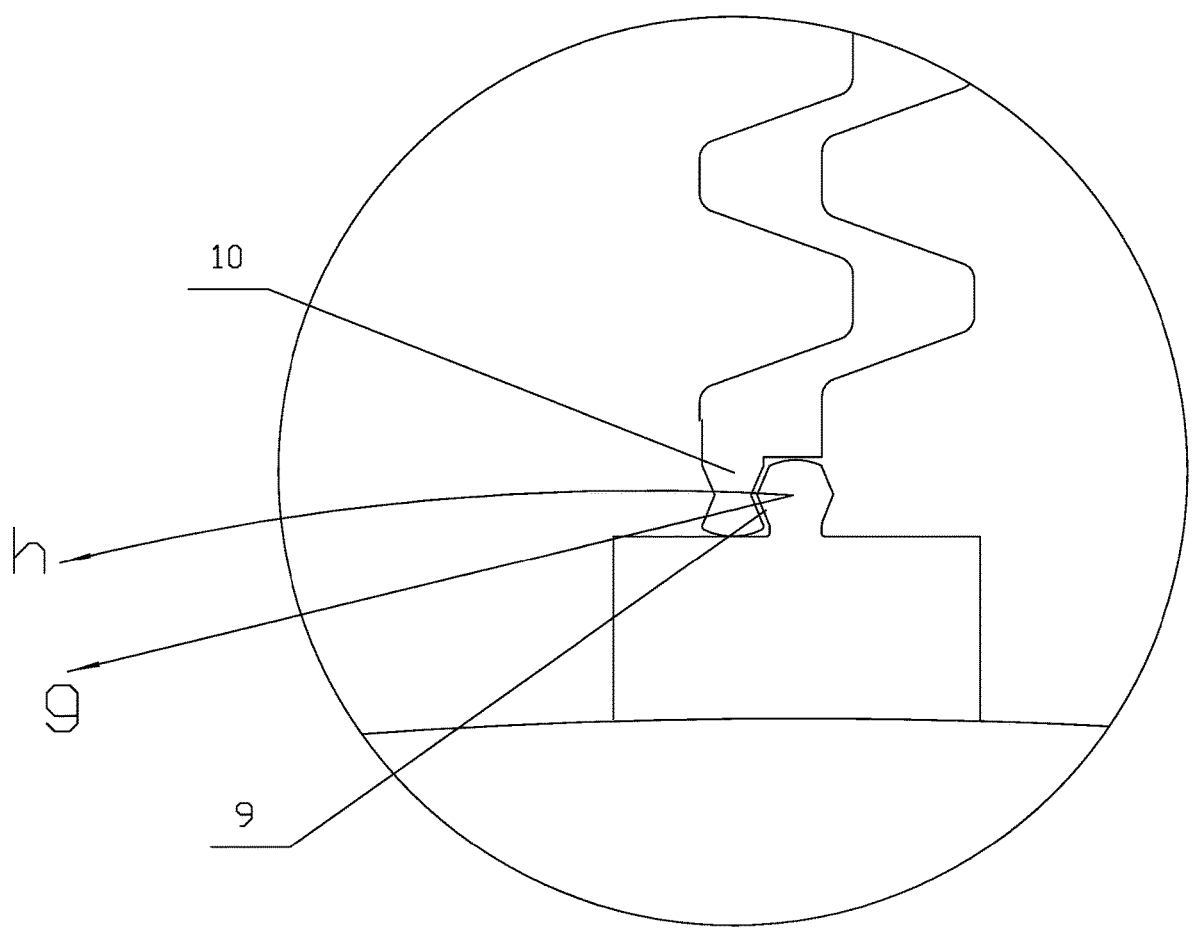
FIG. 5 is a structural schematic view of the fourth embodiment.

As shown in FIG. 5, the structure of the fourth embodiment is basically the same as the structure of the first embodiment. The difference is that the contact surface between driving tooth 9 and passive tooth 10 is a V-shaped surface.

In this embodiment, the force direction g between driving tooth 9 and passive tooth 10 is inwardly deviated relative to the rotation direction h of conveying mesh chain 1, so that when the tightening force of the conveying mesh chain is relatively small, the passive teeth 10 of the conveying mesh chain will not separate and detach from the driving tooth 9 on the rotary drum, and the conveying mesh chain can rotate with the rotary drum, accordingly.

Fifth Embodiment

Figure 6:
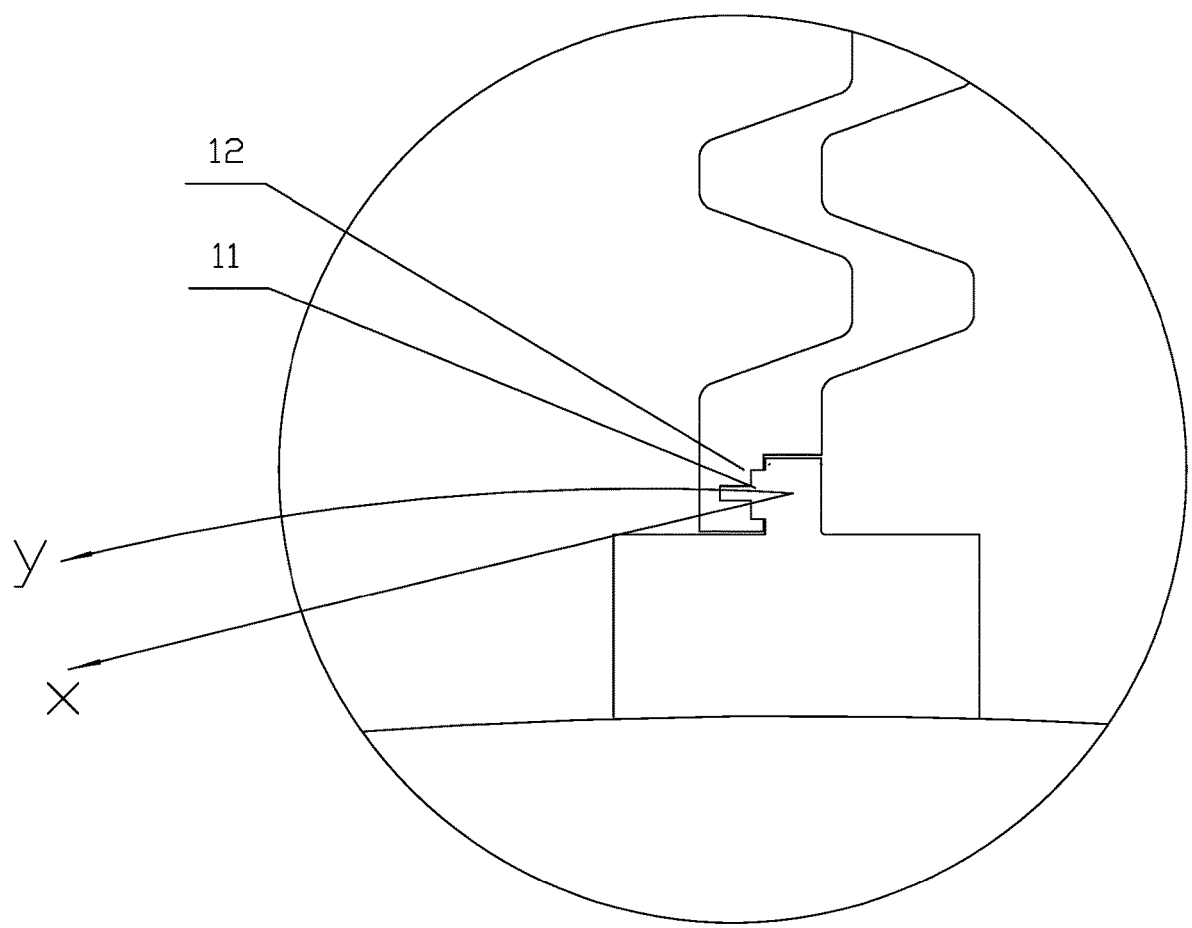
FIG. 6 is a structural schematic view of the fifth embodiment.
Figure 7:
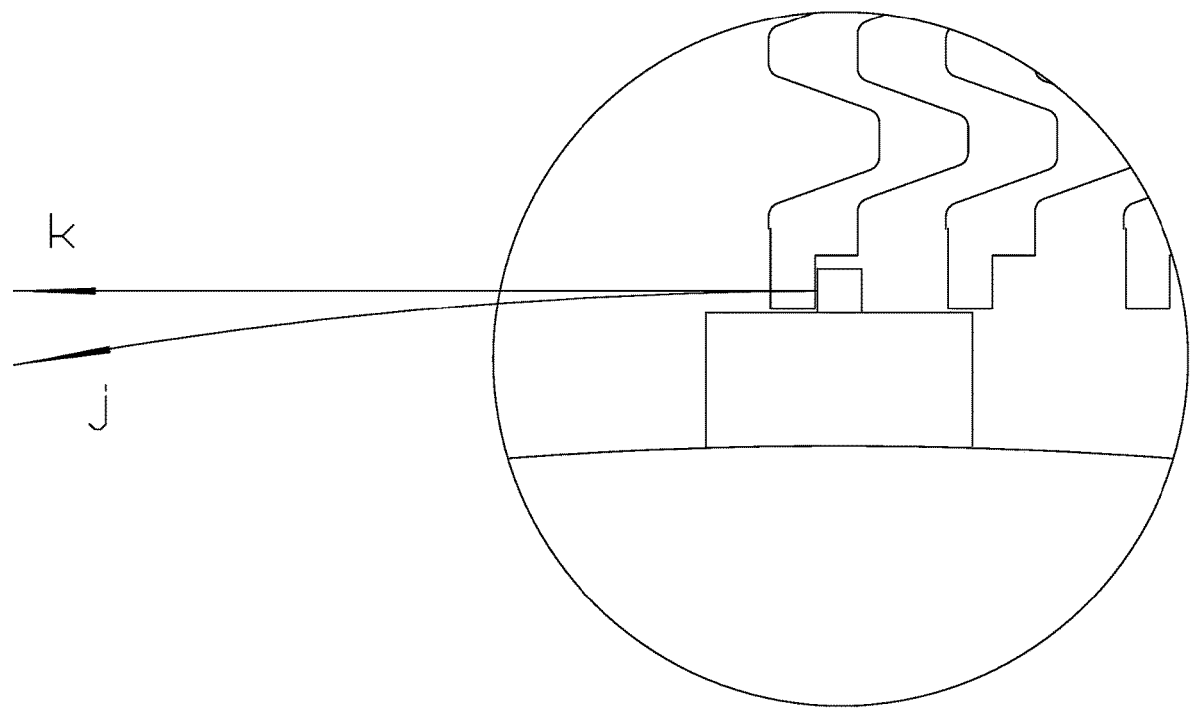
FIG. 7 is a structural schematic view of the prior art.

As shown in FIG. 6, the structure of the fifth embodiment is basically the same as the structure of the first embodiment. The difference is that the contact surface between driving tooth 11 and passive tooth 12 is a T-shaped surface.

In this embodiment, the force direction x between the driving tooth 11 and passive tooth 12 is inwardly deviated relative to the rotation direction y of conveying mesh chain 1, so that when the tightening force of the conveying mesh chain is relatively small, the passive tooth 12 of the conveying mesh chain will not separate and detach from the driving tooth 11 on the rotary drum, and the conveying mesh chain can rotate with the rotary drum, accordingly.

The above-mentioned embodiments are described by taking counterclockwise rotation cooperation of the conveying mesh chain and rotary drum as examples. The principle of clockwise rotations are the same, so they will not be repeated hereinafter.

What is claimed is:

1. A spiral conveying mesh chain, comprising:
a conveying mesh chain main body; wherein
an edge of an inner side of the conveying mesh chain main body is uniformly provided with passive teeth;
the passive teeth engage with driving teeth on an outer periphery of a rotary drum for driving the conveying chain mesh main body to rotate, wherein there is no gap between a top end of the passive teeth and a surface adjacent the driving teeth;
and each contact surface between the passive tooth and the driving tooth is selected from a group consisting of an inclined surface, an arc-shaped surface, a V-shaped contact surface, and a T-shaped contact surface, so that a force direction between the passive tooth and the driving tooth is inwardly deviated relative to a rotation direction of the conveying mesh chain main body, when the conveying mesh chain body has a tightening force on the rotary drum, the passive teeth of the conveying mesh chain body do not separate and do not detach from the driving teeth of the rotary drum to provide the conveying mesh chain body to rotate with the rotary drum continuously.

2. The spiral conveying mesh chain according to claim 1, wherein the contact surface between the passive tooth and the driving tooth is the T-shaped contact surface.

* * * * *